April 26, 1932.   L. H. ROLLER   1,855,692
LIQUID LEVEL INDICATOR AND CONTROLLER
Filed Sept. 28, 1929
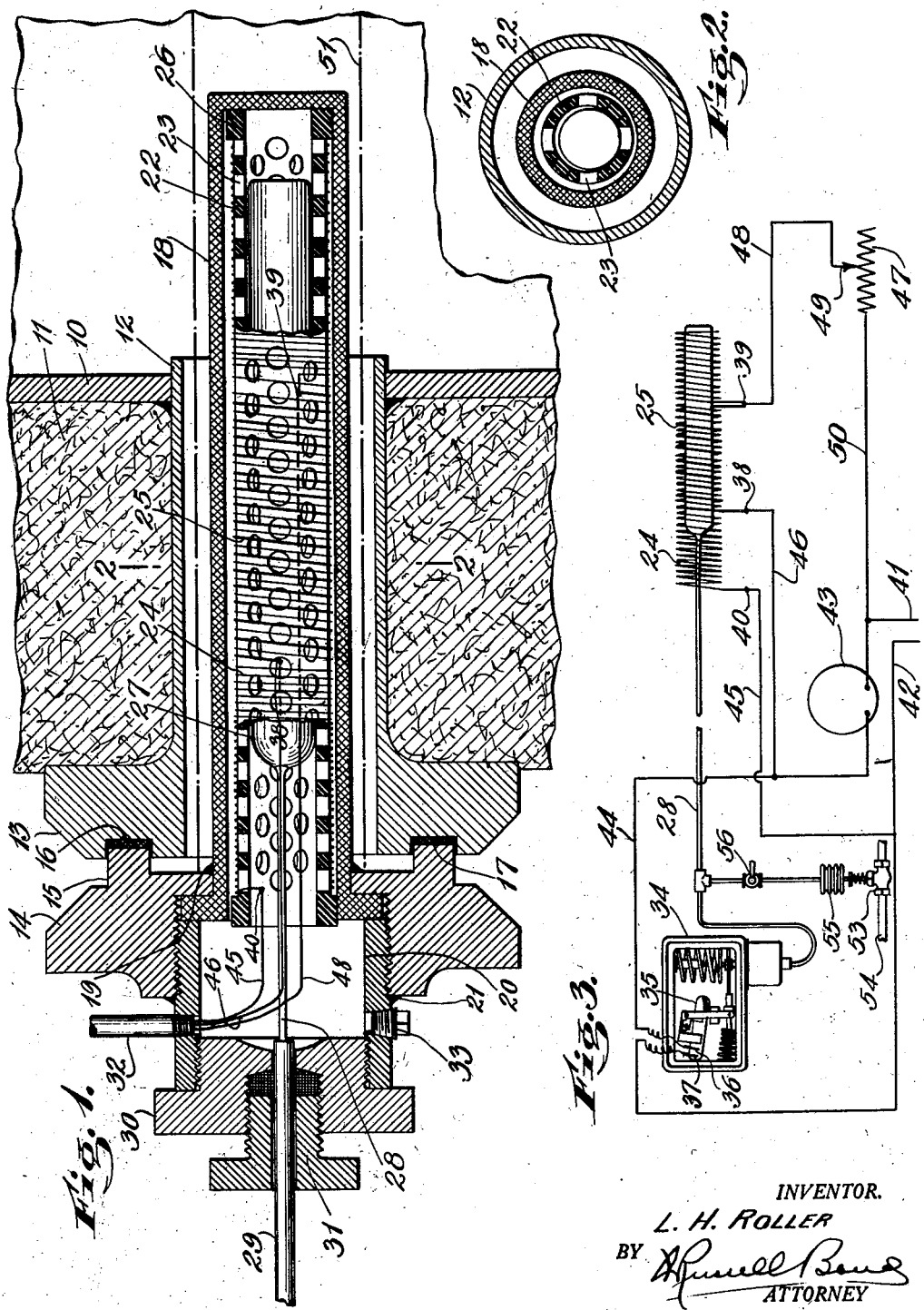
INVENTOR.
L. H. ROLLER
BY
ATTORNEY Patented Apr. 26, 1932

1,855,692

UNITED STATES PATENT OFFICE

LOUIS H. ROLLER, OF WHITE PLAINS, NEW YORK

LIQUID LEVEL INDICATOR AND CONTROLLER

Application filed September 28, 1929. Serial No. 395,779.

My invention relates to improvements in methods of and means for indicating and controlling the level of liquids.

An object of my invention is to provide a liquid level indicator or control apparatus which is especially adapted for use in closed vessels to determine when the liquid level in the vessel has passed a predetermined point, and to operate either a signal or suitable means for varying the liquid level so as to keep it within predetermined limits.

My invention will be found particularly useful in refrigerating apparatus of the compressor condenser type to prevent liquid from entering the compressor. Such apparatus is usually provided with traps in the suction line to trap out any liquid therein but under certain conditions the amount of liquid coming over may be sufficient to flood the traps and then if a slug of liquid enters the compressor it may cause the blowing out of a cylinder head, or other serious damage. It is highly important to provide some means for indicating a dangerous rise of liquid in a trap or accumulator and preferably some control means should be provided for automatically drawing off the liquid when it has risen above a danger line, or for stopping the compressor until the excess liquid has been disposed of. Obviously, the control means must be rugged in construction and reliable in operation. Delicately adjusted mechanism must be avoided and particularly in a high pressure system, such for instance as in an ammonia plant, there should be no moving parts passing through the wall of the trap requiring some form of stuffing-box through which serious leaks might develop. My invention is admirably adapted to meet these conditions as it involves no break in the seal of a closed pressure system. In place of employing float mechanism in the trap which would have to be sealed in and could not be inspected or removed for regulation or repairs I employ a thermo-sensitive element and standard control mechanism actuated thereby. An ordinary thermostat cannot be used in an ammonia vessel because the temperatures of the liquid and its gas are about the same and a thermostat which would detect the chilling effect of a surrounding liquid would be so sensitive as to respond also to the slight temperature changes which are constantly taking place as the suction pressure varies.

It is well known, however, that the transfer of heat between a solid and a liquid is more rapid than the transfer between a solid and a gas and it is a purpose of my invention to use this principle in my level indicator or controller. To this end, I employ a thermosensitive element which is inserted in the vessel at a predetermined point and I supply heat to said element sufficient to maintain a predetermined temperature in said element as long as the liquid does not touch it, but as soon as the liquid does rise and contact therewith the transfer of heat into the liquid will be accelerated to such an extent as to lower the temperature of the element. The reaction of the element to such variations of temperature may then be employed in any well known manner either to operate a signal or automatically to actuate mechanism which will lower the liquid level.

One of the advantages of my invention lies in the fact that all moving parts are located outside of the vessel and the thermosensitive element may be inserted in a fixed casing forming part of the wall of the vessel, so that the element itself may be removed whenever desired without in any way involving a break in the seal of the vessel.

Obviously, my device may be used at a low level and a high level so as to fix limits between which it is desirable to maintain a liquid level.

These and other objects and advantages of my invention will appear in the following description of a preferred embodiment and thereafter the novelty and scope of the invention will be pointed out in the claims.

In the accompanying drawings:

Figure 1 is a view in longitudinal section through the thermo-sensitive level-indicating device;

Fig. 2 is a view in cross section taken on the line 2—2 of Fig. 1; and

Fig. 3 is a diagram of electrical connections.

In Fig. 1, I have indicated at 10 a portion of a vessel adapted to contain a liquid, such for instance as anhydrous ammonia. The vessel 10 is surrounded by a jacket 11 of heat insulation. Passing through the wall of the vessel 10 is a pipe 12 which is welded to said wall. The pipe 12 is provided at its outer end with a standard flange head 13. Bolted to the flange head 13 is an outer annular flange member formed in the usual manner with an annular rib 15 adapted to enter an annular recess 16 in the head 13. Suitable packing material 17 is fitted between the rib 15 and the recess 16 so as to provide a tight seal between the two flange members. Projecting through the pipe 12 into the vessel is a tubular casing 18 closed at its inner end and secured at its outer end to the flange member 14, being preferably welded or sweated thereto, as indicated at 19, so as to form a tight seal therewith. The tubular casing 18 is preferably formed of steel so that it will not be affected by ammonia in the vessel 10. Obviously, when the device is used in other liquids, the material of which the casing is formed may be varied to suit.

A nipple 20 is threaded into the annular flange member 14 and may be sweated thereto as indicated at 21. The nipple forms virtually an outer chamber communicating with the casing 18 and the two thus form a substantially permanent part of the vessel.

Fitted within the tubular casing 18 is a tube 22 of suitable electric insulation material, which is pierced with apertures 23, for a purpose which will appear hereinafter. Wound upon the tube 22 are two coils 24 and 25 of electrical resistance wire. Formed on the tube 22 at opposite ends thereof are collars 26 which are adapted to fit into the bore of the casing 18. The collars may be eccentric to the tube so that the resistance coils will be closer to the casing 18 on the lower side thereof than on the upper side, as clearly indicated in Fig. 2.

Fitted within the tube 22 is a thermostat bulb 27 filled with a volatile fluid. From the bulb 27 leads a flexible tubing 28 which passes through an outer casing 29. The nipple 20 is closed at its outer end by a cap 30 through which the casing 29 passes and a suitable packing box 31 is formed in the plug 30 about the tube 29.

The chamber formed by the pipe 18 and nipple 20 is adapted to be filled with a suitable liquid for transferring heat from the resistance coils to the bulb 27. Leading from the upper side of the nipple 20 is a conduit and vent pipe 32 and a drainage port is formed in the lower side of the nipple 20, this port being normally closed by the screw plug 33.

The tubing 28 leads to a standard control mechanism, as is indicated at 34, in Fig. 3. This mechanism includes a mercury bulb switch 35 which is normally tipped in one direction by expansion of the volatile fluid in the bulb 27, but when the fluid contracts, the bulb is tipped by spring action in the opposite direction, and the mercury in the bulb will close the gap between a pair of contact points 36 and 37.

As explained above, the sleeve 22 carries windings 24 and 25. The winding 24 is of comparatively fine wire and is much longer than the winding 25. The winding 25, however, is concentrated at the center of the sleeve 22. In forming the heating element, the sleeve 22 is preferably cut with a double spiral thread in which resistance wires are seated so that individual coils will be maintained in suitable spaced relation. The winding 25 starts at a point 38 and runs to a point 39. A winding 24 starts at the point 39 where it is connected with winding 25, and runs toward the right, as viewed in Fig. 1, to the end of the tube 22. Then it is carried back on the second thread of the double threading, clear through the winding 25 to the left hand end of the tube 22. From the point 38 to the end it is closely wound on both threadings and finally terminates at a point 40.

As shown in the diagram, current is supplied from a pair of line wires 41 and 42 respectively. The line wire 42 is connected to the contact point 37, while the line 41 is connected by way of solenoid 43 and a lead 44 to the other contact point 36. Bridged across the contact points is the resistance winding 24. As shown in the diagram, there is a lead 45 running from line 42 to the point 40, while from the other terminal 38 of the winding there is a lead 46 running to the lead 44. The resistance winding 25 is connected in parallel with the solenoid 43 through a regulating resistance 47. The circuit can be traced from line 44 through lead 46, to terminal 38, and thence from terminal 39, through a lead 48, a sliding contact 49, regulating resistance 47, and a lead 50 to the line 41. It will be observed also that the windings 24 and 25 are normally connected in series across the lines 41 and 42.

The operation of the apparatus is as follows: We shall assume at first that the level of the liquid in the vessel 10 is below the casing 18, or on the line 51 in Fig. 1. The casing 18 is then surrounded by gas. The mercury switch 35 is so arranged that under these conditions it is in the off position illustrated in the diagram. The resistance windings 24 and 25 are then in series cross the lines 41 and 42 and a certain amount of heat is generated about the thermostat bulb 27. This heat will be conveyed to the bulb by the liquid in the casing 18 and a certain amount of the heat will also be dissipated into the gas surrounding the casing 18. The resistance may be so chosen as to maintain a temperature of say 20 degrees Fahrenheit in the thermostat bulb while the temperature of the gas is zero degree and this, we may assume, is insufficient to hold the switch 35 in the off position. If now the liquid level should rise and submerge the casing 18 there will be a more rapid dissipation of the heat into the contents of the vessel 10 which would chill the thermostat bulb 27 and cause the switch 35 to swing to closed position. This would immediately energize the solenoid 43 and the latter would operate a signal, or would operated a valve in a pipe line connected to the vessel 10, or would initiate the operation of a pump to draw off liquid from the vessel until the level was restored to the line 51. In order to have the switch 35 close immediately after the level of liquid has dropped, it is necessary that additional heat be applied to the thermostat bulb while the tube 18 is submerged. When the switch is in the on position, the resistance coil 25 is alone energized and an increased amount of heat will be generated. This heat may be such as to maintain the bulb at a temperature of say 10 degrees Fahrenheit as long as the casing 18 is immersed in liquid but as soon as the liquid level drops, the temperature of the thermostat bulb will rise very quickly and will operate to throw the switch 35 to the normal off position. By reason of the fact that the resistance coils are mounted eccentrically in the casing 18 there will be a tendency to cause a circulation of the liquid in said casing and through the perforations 23 which will produce a rapid convection of heat into the thermostat bulb 27 and into the casing 18. It will be noted also that the resistance coil 25, which when operating alone generates far more heat than the combined coils 24 and 25, is located centrally in the casing 18 where its effect on the thermostat bulb 27 will be accentuated.

If desired, expansion and contraction of the fluid in the bulb 27 may be used to operate a valve 53 in a feed pipe 54 leading to the vessel 10. The regulating valve is of the type provided with an operating bellows 55 which may be connected through a valve 56 to the tube 28. When the valve 56 is open the valve 53 will be opened or closed to an extent depending upon the temperature of the bulb 27, thus maintaining the liquid level practically constant, whereas, if the liquid level were controlled by a valve in the feed line operated by the solenoid 43 it would be either entirely closed or entirely opened and hence there would be continual fluctuations of liquid level in the vessel 10. When the valve 53 is operated directly by the bulb 27, the solenoid 43 may either be dispensed with or it may be used to operate other apparatus such as a pump or a danger signal when the liquid passes a predetermined level.

While I have described my invention as particularly applied to refrigerating apparatus, I do not limit myself to such application, but contemplate the use of the invention in other apparatus as well. Instead of using a bulb 27 filled with a volatile fluid, I may employ a bi-metallic thermostat which will operate to open or close the circuit across the leads 38 and 40 thus providing a simpler and less expensive construction. Thus, while I have described a specific embodiment of the invention, it will be understood that this is merely illustrative and not limitative of the invention and that I am at liberty to make such changes in construction, arrangement of parts and mode of operation as fall within the spirit and scope of the following claims.

I claim:

1. A method of indicating the level of a liquid with respect to a reference point, which consists in applying heat at said point, and determining the presence or absence of liquid at said point by noting the rate of dissipation of said heat.

2. A method of controlling the level of a liquid with respect to a reference point, which consists in applying heat at said point, and utilizing the variation of temperature due to variations in heat transfer when the liquid level moves past said point to reverse the movement of said level.

3. A method of maintaining a liquid level below a reference point, which consists in applying heat at said point, and utilizing the reduction of temperature caused by increased heat transfer when the liquid rises above said point to actuate means for lowering said level.

4. A method of maintaining a liquid level below a reference point, which consists in applying heat at said point, utilizing the reduction of temperature caused by increased heat transfer when the liquid rises above said point to actuate means for lowering said level, and applying increased heat to said point while the liquid level is being lowered.

5. A method of maintaining a liquid level below a reference point in a closed vessel containing a liquid and a gas of substantially the same temperature, which consists in applying a temperature-sensitive element at said point, applying heat to said element whereby the temperature thereof will be lowered by increased heat transfer to the liquid whenever the liquid level rises above said element, utilizing such reduction of temperature to control the lowering of said level, and utilizing the increase of temperature of the element due to reduced heat transfer when the level drops below the element to arrest the lowering of said level.

6. A method of maintaining a liquid level with respect to a reference point in a closed vessel containing a liquid and a gas of substantially the same temperature, which consists in applying a temperature-sensitive element at said point, maintaining the element at a different temperature from that of the liquid and gas whereby there will be a continuous heat transfer between the contents of the vessel and said element, utilizing variations of temperature in the element due to variations of heat transfer as the liquid level moves past said point in one direction to change the direction of movement of said level.

7. A method of maintaining a liquid level below a reference point in a closed vessel containing a liquid and a gas of substantially the same temperature, which consists in applying a temperature-sensitive element at said point, applying heat to said element whereby the temperature thereof will be reduced by increased heat transfer to the liquid whenever the liquid level rises above said element, utilizing such reduction of temperature to control the lowering of said level, and utilizing the rise of temperature of the element due to reduced heat transfer when the level drops below the element to arrest the lowering of said level, applying increased heat to the element while the liquid is being lowered so as to accentuate said rise of temperature, and cutting off such increased heat application as soon as the lowering of the liquid level has been arrested.

8. In an apparatus for indicating the level of a liquid with respect to a reference point, a thermostat at said point, means for applying heat to said thermostat, and indicating means actuated by variations of temperature in said thermostat as the liquid level moves past said point.

9. In an apparatus for controlling the level of a liquid with respect to a reference point, a thermostat at said point, means for applying heat to said thermostat, and mechanism actuated by variations of temperature in said thermostat as the liquid level moves past said point for causing movement of said level in the opposite direction.

10. In an apparatus for controlling the level of a liquid with respect to a reference point, a thermostat at said point, means for applying heat to said thermostat, mechanism actuated by variations of temperature in said thermostat as the liquid level moves past said point for causing movement of said level in the opposite direction, and means for arresting operation of said mechanism when the level has been restored to a predetermined position.

11. In an apparatus for controlling the level of a liquid with respect to a reference point, a thermostat at said point, means for applying heat to said thermostat, mechanism actuated by variations of temperature in said thermostat as the liquid level moves past such point for causing movement of said level in the opposite direction, means for increasing the application of heat during the operation of said mechanism, and means controlled by the thermostat for arresting the operation of said mechanism and cutting off the increased heat when the level has been restored to a predetermined position.

12. In combination with a vessel containing a liquid and a gas of substantially the same temperature as the liquid, the level of the latter being variable, a temperature-sensitive element in the vessel at a predetermined point, means for applying heat to said element whereby the temperature of the element will be affected by the presence or absence of liquid at that point, and means actuated by an increase of temperature of the element for lowering the level of the liquid below said point.

13. In combination with a vessel containing a liquid and a gas of substantially the same temperature as the liquid, the level of the liquid being variable, a temperature-sensitive element in the vessel at a predetermined point, means for maintaining a difference of temperature between the element, and the contents of the vessel, whereby there will be a transfer of heat between said contents and the element which will increase when the liquid rises above the element, and means controlled by variations of temperature of the element due to such variations of heat transfer for actuating mechanism to control the level of the liquid.

14. A thermal liquid-level indicator comprising a temperature-sensitive element, a heating unit adjacent the same, a casing surrounding the element and unit and adapted to be filled with fluid to conduct heat from the heating unit to said element, and indicating means controlled by the variations of temperature in the temperature sensitive element.

15. A thermal liquid-level controller comprising a temperature-sensitive element, a heating coil surrounding the element, a casing surrounding the heating coil and adapted to be filled with a fluid to conduct heat from the coil to said element, the axis of said coil being below the axis of the casing to promote circulation of the fluid, actuating means controlled by variations of temperature of said element, and means operating when the temperature of said element is lowered to increase the heat in the heating coil.

16. In combination, a closed vessel adapted to contain a liquid and a gas, both of substantially the same temperature, a casing projecting into the vessel, an electric resistance unit in the casing, a temperature-sensitive element within the resistance unit, means controlled by variations of temperature in the said element for varying the level of said liquid, and means also controlled by variations of temperature of said element for varying the heat generated by the resistance element.

17. In combination, a closed vessel adapted to contain a liquid and a gas both of substantially the same temperature, a casing projecting into the vessel and permanently secured thereon, an electric resistance unit removably mounted in the casing, a temperature-sensitive element within the resistance unit, means controlled by variations of temperature in said element for varying the heat generated by the resistance unit, and means also controlled by variations of temperature of said element for varying the level of said liquid, the casing being adapted to contain a liquid to conduct heat from the resistance unit to the temperature sensitive element.

18. In a device of the character described, a casing, a heating unit comprising a pair of resistance coils mounted in the casing, a temperature-sensitive element mounted within the resistance coils, and means operating to connect the coils in series with a source of energy when the temperature of the temperature-sensitive element is normal and for connecting the resistance coils in parallel to said source of energy when the temperature of the element is lowered.

19. In combination, a closed vessel adapted to contain a liquid and a gas of the same temperature as the liquid, the level of the liquid being variable, a casing projecting into the vessel at a predetermined point and permanently secured therein, an electric resistance unit comprising a pair of resistance coils removably mounted in the casing, a temperature sensitive element within the coils, the casing being filled with liquid to transfer heat from the resistance unit to said element, a means for changing the liquid level, means controlled by variation of temperature in the element due to the rise and fall of liquid past said casing, for controlling the operation of said level changing means, and means also controlled by said element for connecting the resistance coils in series with a source of energy when the level changing means is idle and for connecting one of the resistance coils with said source of energy while the level changing means is operating.

In testimony whereof, I have signed this specification.

LOUIS H. ROLLER.